(12) United States Patent
Schuller

(10) Patent No.: US 6,882,980 B1
(45) Date of Patent: Apr. 19, 2005

(54) CHEMICAL PRODUCT COMMERCE NETWORK

(75) Inventor: Joan Schuller, Gladwyne, PA (US)

(73) Assignee: Rohm and Haas Company, Philadelphia, PA (US)

( * ) Notice: Subject to any disclaimer, the term of this patent is extended or adjusted under 35 U.S.C. 154(b) by 653 days.

(21) Appl. No.: 09/608,635

(22) Filed: Jun. 30, 2000

Related U.S. Application Data
(60) Provisional application No. 60/203,243, filed on May 8, 2000.

(51) Int. Cl.$^7$ .............................................. G06F 17/60
(52) U.S. Cl. ..................................................... 705/26
(58) Field of Search .................................... 705/26, 27

(56) References Cited

U.S. PATENT DOCUMENTS

| | | | |
|---|---|---|---|
| 6,073,055 A | 6/2000 | Jahn et al. ..................... | 700/97 |
| 6,594,642 B1 * | 7/2003 | Lemchen ....................... | 705/26 |
| 2001/0037255 A1 * | 11/2001 | Tambay et al. ................ | 705/26 |
| 2001/0047309 A1 * | 11/2001 | Bartholomew et al. ....... | 705/26 |
| 2003/0110101 A1 * | 6/2003 | Friel et al. ..................... | 705/28 |

FOREIGN PATENT DOCUMENTS

| | | | | |
|---|---|---|---|---|
| JP | 401161578 A | * | 6/1989 | ........... G06F/15/60 |

OTHER PUBLICATIONS

"Rohm and Hass Selects Hyprotech's BDK to Enhance Process Development", Business Wire, New York, Oct. 5, 1998, p. 1.*
"Eastman Chemical Company . . . " (Press Release. Mar. 17, 2000).*
"Solvents—continuing to evolve for the future" (Beers et al. 1998. Pigment and Resin).*
"WorldWideTesting.com . . . the Missing Link" (Press Release. Jun. 22, 1999).*
"WorldWideTesting.com Poised to Redefine the Scope of Commodities Trading" (Press Release—Nov. 15, 1999).*
"WorldWideTesting.com . . . the Missing Link" (Press Release—Jun. 22, 1999).*
"Producers, thirs–party exchanges gear up for the online buy" (Reilly, Christopher. Dec. 16, 1999. Purchasing).*
Pages from www.worldwidetesting.com excised from web.archive.org dated Jan. 2000–Apr. 2000.*
"Worldwidetesting.com and Chemical.netä.announce strategic partnership" (May 11, 2000. Press Release—Worldwide-Testing.com).*
Pages from the website www.worldwidetesting.com, excised from "The Wayback Machine" (web.archive.org) dated from Jan. to Mar. 2000.*

* cited by examiner

*Primary Examiner*—Jeffrey A. Smith

(57) ABSTRACT

Computer implemented methods for processing transactions involving chemical products include receiving at a server computer from a client computer transaction data that includes a product identifier. In response, testing of a sample of the identified product is scheduled and results of the sample testing are stored in a database. The results may be retrieved in response to a subsequent query from the user and sent over a network to the user. In another aspect, characteristics of a chemical product produced according to a particular formulation are determined, the formulation may be modified, and characteristics of a produce produced according to the modified formulation can be determined. A networked computer system that includes a server, a database, and a memory is configured to exchange data with client computers and is coupled to a database that stores chemical product data for a number of chemicals materials. The chemical product data can include, e.g., starting point formulations (i.e., recipes combining chemical materials to produce a product). The memory includes instructions that can configure the server to communicate over a computer network with a client computer. The client computer can communicate a product identifier to the server and, based on that identifier, the server may query the database to retrieve chemical product data which is then returned to the client computer.

9 Claims, 1 Drawing Sheet

CHEMICAL PRODUCT COMMERCE NETWORK

CROSS-REFERENCE(S) TO RELATED APPLICATIONS

This application claims the benefit of the filing date of U.S. provisional application Ser. No. 60/203,243 entitled "Chemical Product Commerce Network" which was filed on May 8, 2000.

BACKGROUND OF THE INVENTION

Electronic commerce (e-commerce) is changing the way in which industries provide business services. E-commerce web sites, web portals, and other electronic purchasing systems can provide rapid and fully automated arms-length purchasing transactions and comparison shopping. Typical automated purchasing systems are designed for the purchase of known product configurations. For products requiring specialized preparation, testing, handling, and care, or for which unknown factors need to be determined, traditional e-commerce system designed for pre-configured product sales and distribution may be inappropriate. Consequently, improved e-commerce systems able to handle more complex product sales and configuration issues are desired.

Improved e-commerce systems handling complex product sales and configuration issues can benefit the chemical industry as well as many other industries. Chemical manufacturers may sell chemicals that have application-specific and formulation-specific characteristics. Application-specific and formulation-specific characteristics of a new product or new application of an existing product may be unknown. In such cases, prior to product use, a purchaser may need to separately contract for, or otherwise engage in, product formulation, testing and other suitability assurance processes. Advantages can be gained by streamlining these processes using a computer-automated system.

SUMMARY OF THE INVENTION

In general, in one aspect, the invention features computer implemented methods for processing transactions involving chemical products. These methods include receiving at a server computer from a client computer transaction data that includes a product identifier. In response, testing of a sample of the identified product is scheduled and results of the sample testing are stored in a database. The results may be retrieved in response to a subsequent query from the user and sent over a network to the user. In another aspect, the methods include receiving input data that identifies a formulation of a chemical product. The formulation can identify a combination of chemicals and raw materials, as well as process steps, used to produce a particular chemical product. Additional data associated with the formulation (e.g., characteristics of different chemicals and raw materials in the formulation) is then retrieved from a database and then processed to determine expected characteristics of that particular chemical product. The formulation may be modified based on interaction with a user (e.g., via data exchanged with a web browser at client computer). The modified formulation may then be analyzed to determine characteristics of a product produced in accordance with the modified formulation.

In general, in another aspect, the invention features a networked computer system that includes a server, a database, and a memory. The server is configured to exchange data with client computers. The database is operatively coupled to the server and stores chemical product data for a number of chemicals materials. The chemical product data can include, e.g., starting point formulations (i.e., recipes combining chemical materials to produce a product). The memory includes instructions that can configure the server to communicate over a computer network with a client computer. The client computer can communicate a product identifier to the server and, based on that identifier, the server may query the database to retrieve chemical product data which is then returned to the client computer.

Implementations may include one or more of the following features. The product may be a paint or other industrial coating product. Sample testing may include applying the product to a surface and monitoring the applied product to determine effects of environmental exposure and aging. Digitized photos and other video images of the sample can be obtained and stored in a database. These images may then be sent to a user to convey the results of the sample testing. A sequence of images, taken at different times, may be stored in the database to record progressive effects of environmental exposure and aging.

Implementations also may include one or more of the following features. The chemical product data may include material safety data, properties of chemicals, characteristics of manufacturing processes, and other manufacturing data, and sample testing result data. The memory can also include instructions to configure the server to receive and process a purchase orders. Security and to validate features may be implemented to ensure that only valid users can access the chemical product data. The security and validation may validate for a number of different conditions including, payment information, proper purchaser credentials (e.g., validated safety credentials and, in the case of hazardous materials, proper purchasing authority), etc. The formulation can include instructions detailing a combination of raw chemical materials, and the method can further include receiving a purchase request to purchase a chemical products included in the formulation.

The details of one or more embodiments of the invention are set forth in the accompanying drawings and the description below. Other features, objects, and advantages of the invention will be apparent from the description and drawings, and from the claims.

DETAILED DESCRIPTION OF THE INVENTION

Figure 1:
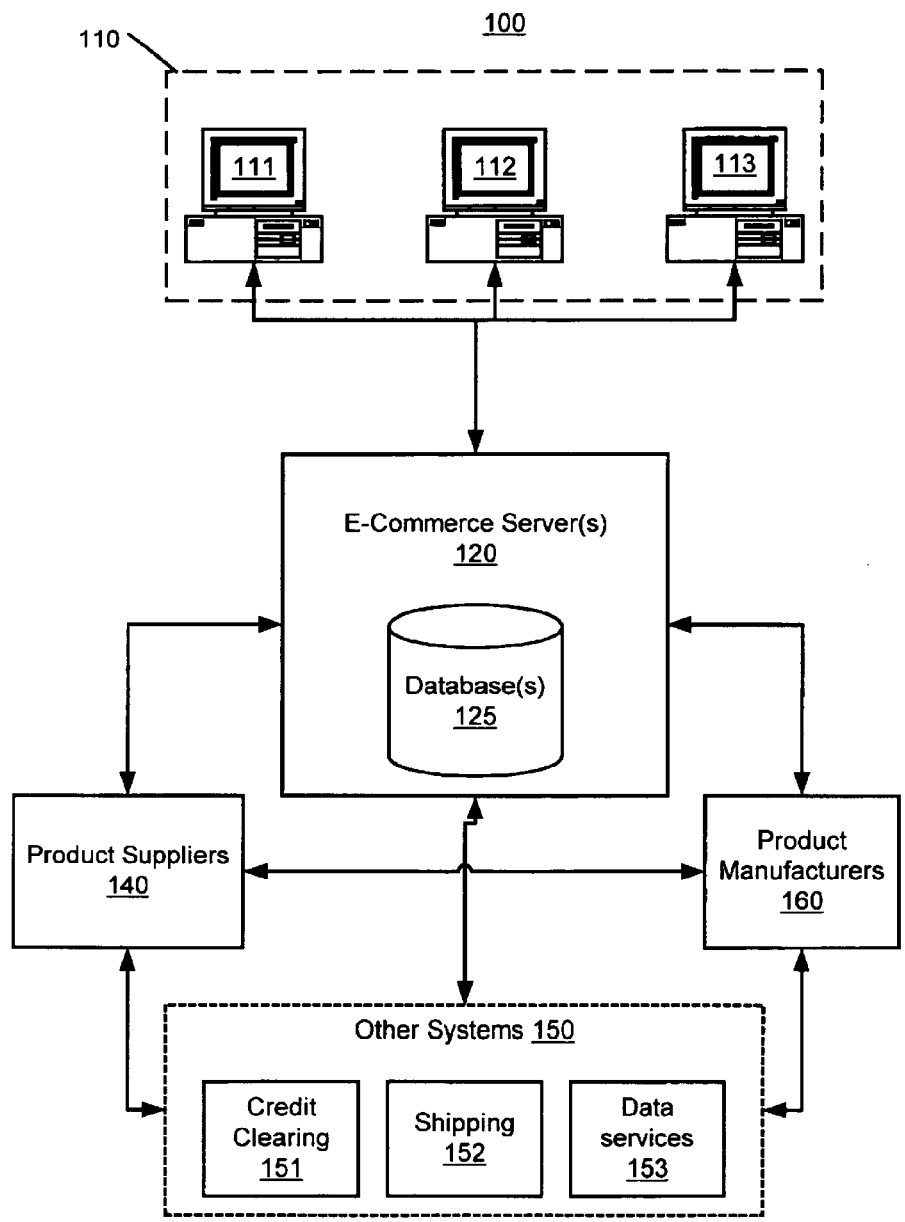
FIG. 1 is an network block diagram.

FIG. 1 shows an e-commerce system 100 for use in the paint formulation and product sales industry. The system 100 include a web server 120. The web server 120 includes a database 125 storing product information as well as other data used in providing e-commerce services. The web server 120 is connected over the Internet or other network to one or more user terminals 111–113. In addition, the server 120 can have interfaces to material supplier databases 140, production and product manufacturer systems 160 as well as to other computer systems 150 (e.g., credit clearinghouses 151, common carrier shipping systems 152, information data services 153, etc.).

The web server 120 provides HTML pages and forms to user terminals 111–113, thereby allowing the server 120 to exchange product, service, and purchase data with users of the terminals 111–113. The exchanged data can include queries about particular products, purchaser identification information, an selection of a desired product and product volume, shipping address information, a designation of a preferred shipper, and a designation of a preferred manufacturer. Other conventional e-commerce data also can be exchanged-between the web server 120 and the user terminals 111–113. For example, the server 120 may receive purchase order information from user terminal 111 and verify the purchaser's credit and/or draw funds by interacting with a credit card transaction clearinghouse system 151, schedule product delivery by exchanging data with a shipping system computer 152 and with a product supplier 140. Data exchanged with systems 140, 150, 160 can be used to schedule merchandise pick-up and delivery, to confirm stock levels, determine pricing, and/or for other purposes.

Web server database 125 is provisioned with data allowing the server 120 to respond to queries requesting information about products, product applications, suppliers, shippers, order status, product formulation and testing services, testing results, etc. In the paint products industry, the database 125 may include information on the large number of raw material used to manufacture a paint products, material safety data sheets, material use and application guides, as well as data about manufacturing processes. Raw materials data also can include, among other things, data about binders, dispersants, colorants, biocides, extenders, titanium dioxide (TiO2), surfactants, and their components. Data about paint manufacturing processes can include formulation data and manufacturing process data. The formulation data can include paint recipes (i.e., predetermined formulations), data about suitable use and applications for particular materials, and well as data about interactions between materials. The manufacturing process data can include, e.g., data describing suitability for use, and response of, various raw materials to particular manufacturing processes. For example, the database 125 may capture data about a materials characteristics after exposure to various temperatures or mixing steps. The manufacturing process data can also include data about manufacturing facilities. For example, the database 125 may identify manufacturing facilities with particular equipment or capacity need for a particular manufacturing job. In some cases, data in database 125 may be dynamically updated via interfaces to external systems 140, 150, 160. Thus, the server 120 can act as a repository for a full range of chemical product information, including information about raw materials, about how to process and combine those materials through various manufacturing processes, and about the application of the materials both in raw and combined forms. Information, products, and services available via the server 120 may be available on a pay-per-product or subscription basis.

The web server 120 may provide a "one stop shop" for chemical product formulating information and services where registered user can get information and can formulate chemical products online. In some cases, information on the web server may be provided on a paid sponsorship basis. For example, suppliers may pay to have their products listed. Users may pay an annual fee for a particular number of users, access sessions, or services. Services also can be provided on a pay-per-use basis. The system may provide for "virtual" tours of the test fences. For example, using stationary or mobile cameras, digital images of test samples can be collected, stored at the server 120, and accessed by users. The server 120 also can interact with users at terminals 110 to receive product and material purchase orders. The server can process a purchase order by displaying product catalogs, receiving user selections of particular products, and collecting purchase, shipping, and payment information from a user.

From time to time, paint manufacturers may create or modify paint formulations to improve performance of their paint products, to adapt a formulation for a new application, and to take advantage of new materials and processing techniques. The system 100 can help a manufacture to create new formulations or to modify existing formulations. To aid in creating or modifying formulations, the server 120 can provide access to paint formulation information and services. Paint formulation information can include raw material product information in the database 125 (e.g., binding, hardness, fading characteristics of various unprocessed and processed chemical product, etc.). This information can be provided to a user based on the user's selection of products. The database can also include formulations ("recipes") that are available to a user. These recipes can include detail listings of raw materials and processing steps used to formulate particular paint products. Each listed material or processing step may be associated with a hypertext link to additional information, manufacturer web sites, or to a product purchasing service. The database 125 can store characteristics of paint products made from the supplied recipes. These characteristics can include, e.g., adhesion properties when applied to different materials, scuff resistance, fading characteristics, use environments (e.g., indoor or outdoor), environmental characteristics (e.g., non-volatile organic compound content), etc.

After a recipe has been approved by a purchaser, the site 120 can complete order processing by interacting with seller, shipper, purchaser, credit clearinghouse and other external systems 140, 150, 160. In some cases (e.g., raw material purchases) the system can interact with other manufacturer and shipper systems to material shipments from warehouse(s) to the user. The system also may schedule shipment of raw materials from different warehouse sites to a product blending and manufacturing site where processing of the raw materials into a completed product can take place. The completed product can then be shipped to the user.

In some cases, a user may not want to use one of the server's preexisting paint recipe, or the existing recipes may not have the characteristics required by the user. Such users may benefit from a custom paint formulation service provided by the server. The custom paint formulation service may allow the user to enter a starting point recipe or to query for a recipe to be used as a starting point. The operation of the paint formulation service may begin with a data gathering stage. In the data gathering state, the server can collect target characteristic information from a user. This target characteristic information may then be compared to known product, process, and formulations characteristics of products produced using recipes stored in the database 125. This comparison can include weighing different target characteristics against the known characteristics to determine a ranking of recipes. For example, binding and opacity properties specified by a user as target characteristics can be compared to the binding and opacity properties of paints produced using the known recipes. This comparison can be done, e.g., by measuring a difference between user-specified target characteristics and known characteristics to determine an overall ranking score for a particular formulation. This scoring process can be repeated for a number of different known formulations and the results may be presented to the user as a best-to-worst listing of suggested starting point formulations. The user may then select one of the recipes as a starting point recipe. Users can also enter one of their existing recipes as a starting point recipe. Custom formulation capabilities may be provided by software systems including, by way of example, the BatchMaster program from BatchMaster Software Corporation, the BDK Integrated Batch Process Development system from AEA Technology Hyprotech Ltd, and the software system described in the application entitled "Computer-Based Product Formulation" filed on Jun. 30, 2000, naming inventors Dr. John W. Hook, III, and Dr. Daniel Pietri.

The paint formulation service also can include access to a paint formulation expert system that can help a user analyze and modify their starting point recipe. The expert system can interact with a user to collect data about desired paint product characteristics. Based on the data from the user, and on paint formulation knowledge and rules stored in the database 125, the expert system can calculate characteristics required by a recipe to meet the user-specified target characteristics and/or may calculate the characteristics of a product produced according to user-modifications of a starting point recipe. Such expert system predictions can help a user avoid unnecessary expenses and delays associated with producing an experimental paint product.

The paint product commerce site may facilitate product use and application testing. When a new paint formulation recipe is developed, a small batch of the paint may be produced and evaluated through application testing. Outdoor paint product may be tested, e.g., by painting wood samples which are then placed in an outdoor test farm for environmental exposure testing. The painted wood samples may then be monitored to determine the effects of environmental exposure. Monitoring by on-site inspections can create inconveniences since samples may be located at remote sites or, in the case of multiple sample exposures, may be at geographically distributed locations. The system 100 can offer alternatives to on-site sample inspection. In particular, the system 100 can include a database 125 storing periodically obtained sample monitoring data. Sample monitoring data can then be remotely accessed by a user using a web browser. In the case of paint samples, the data may be digital photo images that can be remotely retrieved at a web browser. For each sample being monitored, the system 100 can retain multiple periodically obtained images (e.g., weekly or monthly) so as to form a historical journal of the exposure testing process.

In addition to formulation functions, information providing functions, and other functions described herein, the database 125 may record purchase volumes, purchasers, shippers, products and other information associated with completed and failed transactions. This information may be used for, e.g., data mining, marketing, trend tracking, sale forecasting, and other purposes.

Processing and presentation of the data at user terminals may be performed by web browser software such as Microsoft Internet Explorer Version 5.0, a Netscape Navigator Version 4.0 browser, or other client software products such as a Lotus Notes client or a Microsoft Outlook client. Data processing and presentation by a browser may conform to requirements of standardized data formatting protocols, such as the Hypertext Markup Language (HTML), Dynamic HTML (DHTML), or Extensible Markup Language (XML). Browsers also may provide for the download and execution of software, such as through the use of a Java® Virtual Machine to execute Java programs. Other data formatting and presentation protocols, other programming languages, and rich media data such as audio, video, and animation files also can be exchanged between the server and clients and processed by browser software or by other client software (e.g., by a Java program). Conventional aspects of web server 120 may be handled using standard web server technologies and platforms. For example, Apple WebObjects(r), Lotus Domino(r), and/or Sun-Netscape alliance iPlanet™ software may be used to interact with customers and receive purchase order data.

Each computer systems described herein may be implemented using a single-processor computer or a multi-processor computers. Multi-processor computers can include tightly coupled computer systems, such as symmetric multi-processor computer systems, as well as loosely coupled computer clusters and geographically distributed computers connected by a network. Database systems may be implemented as a sub-component of a computer system that also provides other processing functions (e.g., a database may be implemented using storage media coupled to a computer processing business logic). Databases can also be implemented using dedicated database servers and storage. Processing and database systems may be implemented as distributed systems. For example, although presented as a single logical system, the database system 125 may include a number of physically separate database systems each having their own computer processing and data storage facilities. A database can also include a data structure stored in a transitory memory, such as a data structure stored in RAM memory.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

Implementations may include one or more of the following advantages: Manufacturers can sell products using automated e-commerce systems that can automatically facilitate the providing of complex purchase-related processes. For example, in the chemical industry, chemical product formulation requirements can be ensured. Multiple vendors can interface with, and contribute to, a single database system to enable efficient sharing of product-related information. Data regarding customer purchases can be aggregated and analyzed to perform market analysis. Manufacturers can outsource the storage and distribution of product-related information to a third party web site provider.

A number of embodiments of the present invention have been described. Nevertheless, it will be understood that various modifications may be made without departing from the spirit and scope of the invention. The disclosure herein describes, as an example, a web site system implemented for paint product purchasing and formulation. Implementations could address other product needs. For example, in an agricultural implementation, a user may formulate a fertilizer or pesticide product and schedule testing on sample crops (this example is intended to parallel the exposure testing of paint products on wood surfaces). Still other industries and needs may be addressed by the system 100.

What is claimed is:

1. A networked computer system configured for commerce in chemical products, the system comprising:
    a server configured to exchange data with a plurality of client computers;
    a database operatively coupled to the server and storing chemical product data for a plurality of chemical products;
    a memory operatively coupled to the server and comprising instructions to configure the server to:
        receive a request comprising a product identifier from a first one of the plurality of client computers,
        query the database in response to the received request to retrieve chemical product data comprising a starting point formulation and chemical characteristics inherent to the starting point formulation,
        send the product information to the first client computer,
        receive a purchase order comprising a request to purchase a product identified by the product identifier and target characteristics input by a user,
        modify the starting point formulation based on the target characteristics input by the user, and
        process the purchase order, wherein the purchase order comprises an order for purchase of a chemical product formulated in accordance with said modified starting point formulation.

2. The system of claim 1 wherein the sent chemical product data further comprises data selected from the group consisting of material safety data, chemical property data, processing data, and product manufacturing data.

3. The system of claim 1 wherein the sent chemical product data further comprises testing result data stored in the database in response to a sample testing request.

4. The system of claim 3 wherein the product information comprises testing result data.

5. The system of claim 4 wherein the database further comprises user access permission information and the memory further comprises instructions to query the database to validate access by a user of the first computer, and the instructions to send the product information comprise instruction to send only if access by the first user is validated.

6. The system of claim 1 wherein the memory comprises a disk storage media configured as an integral component of the server.

7. A method for processing a chemical product transaction, the method comprising:
    receiving at a server computer from a first one of a plurality of client computers a request identifying a chemical product,
    querying a database in response to the received request to retrieve chemical product data comprising a starting point formulation and chemical characteristics inherent to the starting point formulation,
    sending the chemical product data to the first client computer,
    modifying the starting point formulation based on the target characteristics input by the user,
    receiving a purchase order comprising a request to purchase the chemical product,
    processing the purchase order, said purchase order comprising an order for purchase by the user of a chemical product formulated in accordance with said modified starting point formulation.

8. The method of claim 7 wherein the chemical product data further comprises data selected from the group consisting of material safety data, chemical property data, processing data, and product manufacturing data.

9. The method of claim 7 wherein the chemical product data further comprises testing result data stored in the database in response to a sample testing request.

* * * * *